United States Patent [19]

Weaver et al.

[11] 4,324,719
[45] Apr. 13, 1982

[54] AZO DYES FROM AMINOPHTHALIMIDES AND ANILINE, TETRAHYDROQUINOLINE, AND BENZOMORPHOLINE COUPLERS HAVING THIOSULFATE GROUPS

[75] Inventors: Max A. Weaver; Clarence A. Coates, Jr., both of Kingsport, Tenn.

[73] Assignee: Eastman Kodak Company, Rochester, N.Y.

[21] Appl. No.: 159,093

[22] Filed: Jun. 13, 1980

[51] Int. Cl.$^3$ .................... C09B 29/036; C09B 29/36; C09B 29/44; D06P 3/26
[52] U.S. Cl. .................... 260/152; 260/155; 260/165; 260/326 N; 260/453 RY; 544/105; 546/165; 546/166
[58] Field of Search ................. 260/152, 155, 165

[56] References Cited
U.S. PATENT DOCUMENTS

| | | | |
|---|---|---|---|
| 2,659,719 | 11/1953 | Dickey et al. | 260/158 |
| 2,683,709 | 7/1954 | Dickey et al. | 260/158 |
| 3,226,395 | 12/1965 | Shimmelschmidt et al. | 260/158 |
| 3,870,696 | 3/1975 | Feeman | 260/158 |
| 4,180,503 | 12/1979 | Vor der Bruck et al. | 260/165 X |

*Primary Examiner*—Floyd D. Higel
*Attorney, Agent, or Firm*—Donald W. Spurrell; Daniel B. Reece, III

[57] ABSTRACT

Disclosed are azo dyes suitable for coloring polyamide material, particularly nylon carpet and which are prepared from aminophthalimides and couplers which are

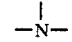

substituted with a thiosulfate ester group. These dyes produce yellow to blue shades and also color cellulose acetate fabrics and wool. The dyes have the general formula:

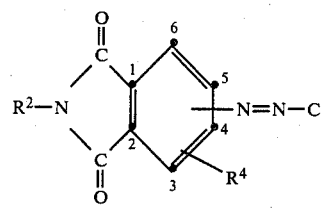

wherein $R^2$ and $R^4$ are each selected from hydrogen and a large variety of organic substituents, the coupler C is an aniline, 1,2,3,4-tetrahydroquinoline, or benzomorpholine derivative wherein a Q-SSO$_3$M group is attached to the nitrogen thereof, Q being a lower alkylene or similar linking group, and M is Na$^+$, K$^+$, NH$_4^+$, or H$^+$. The present dyes are superior in such properties as fastness to light, oxides of nitrogen, wash, ozone, sublimation, perspiration and crock, and exhibit good dyeability including migration, leveling, pH stability, and build.

4 Claims, No Drawings

AZO DYES FROM AMINOPHTHALIMIDES AND ANILINE, TETRAHYDROQUINOLINE, AND BENZOMORPHOLINE COUPLERS HAVING THIOSULFATE GROUPS

This invention concerns azo dyes suitable for coloring polyamide material, particularly nylon carpet and which are prepared from aminophthalimides and couplers which are

substituted with a thiosulfate ester group. These dyes produce yellow to blue shades and also color cellulose acetate fabrics and wool. The dyes have the general formula:

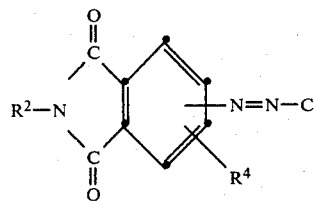

wherein $R^2$ and $R^4$ are each selected from hydrogen and a large variety of organic substituents, the coupler C is an aniline, 1,2,3,4-tetrahydroquinoline, or benzomorpholine derivative wherein a Q-SSO$_3$M group is attached to the nitrogen thereof, Q being a lower alkylene or similar linking group, M is Na$^+$, K$^+$, NH$_4$$^+$, or H$^+$. The present dyes are superior in such properties as fastness to light, oxides of nitrogen, wash, ozone, sublimation, perspiration and crock, and exhibit good dyeability including migration, barre coverage, leveling, pH stability, and build. The unique combination of properties possessed by our novel compounds renders them superior to the compounds disclosed in Canadian Pat. No. 776,561, French Pat. No. 1,358,145, the Indian Journal of Technology, Vol. 9, pp. 175–178, Offenlegungsschrift No. 2,164,198, U.S. Pat. Nos. 2,245,971 and 4,039,522.

Our novel azo compounds are synthesized by diazotizing a 3- or 4-aminophthalimide having the formula

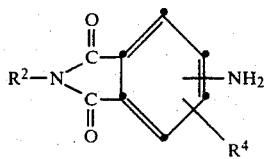

and coupling the resulting diazonium salt with a coupler selected from those having the formulae

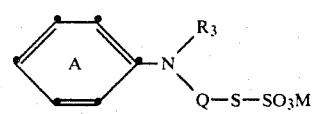

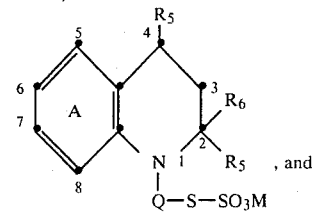

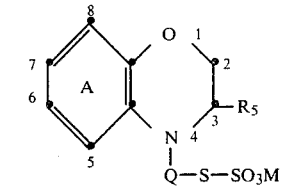

according to conventional techniques. The 3-aminophthalimides in which $R^2$ is hydrogen, are prepared by reacting 3-nitrophthalic anhydride with ammonia followed by the reduction of the nitro group to the amino group whereas the analogous 4-amino compounds are prepared by reacting phthalic anhydride with ammonia followed by nitration and reduction. The corresponding aminophthalimide compounds in which $R^2$ is a substituent are prepared by the mentioned techniques except that a primary amine is substituted for the ammonia. Alternatively, the aminophthalimide compounds in which $R^2$ is a substituent can be prepared by reacting either phthalimide or a nitrophthalimide with an alkylating agent such as an aliphatic halide. The particular substituent represented by $R^2$ is, in general, not critical. The primary amines from which substituent $R^2$ can be derived have the formula $R^2$—NH$_2$ in which $R^2$ is an unsubstituted or substituted aliphatic, alicyclic, aromatic or heterocyclic residue having a molecular weight of not more than about 200. In view of the vast number of primary amines and aliphatic halides which are known and/or can be synthesized by conventional procedures and since the substituent represented by $R^2$ is not critical, complete elaboration on the groups represented by $R^2$ is not practical. However, it is preferred that substituent $R^2$ be devoid of additional amino groups. Typical types of substituents in addition to hydrogen which $R^2$ can represent are as follows: alkyl; cyclohexyl; cyclohexyl substituted with alkyl; or alkyl substituted with alkoxy, aryl, aryloxy, cyclohexyl, cyano, alkanoyloxy, alkoxycarbonyl, alkoxycarbonyloxy, aroyloxy, alkylcarbamoyloxy, arylcarbamoyloxy, or with a group having the formula

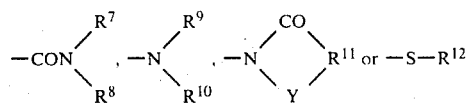

wherein
$R^7$ individually is hydrogen, alkyl or aryl;
$R^8$ individually is hydrogen or alkyl;
$R^7$ and $R^8$ collectively are —(CH$_2$)$_5$— or —CH$_2$CH$_2$OCH$_2$CH$_2$—;
$R^9$ is an acyl radical;
$R^{10}$ is hydrogen, alkyl, aryl, or cyclohexyl;
$R^{11}$ is ethylene, propylene, trimethylene, o-cyclohexylene, or o-arylene, or when Y is —CO—, $R^{11}$ also can be —NHCH$_2$—, —N(lower alkyl)CH$_2$—, —SCH$_2$—, —OCH$_2$—, or —CH$_2$OCH$_2$—;

Y is —CH₂—, —CO—, or —SO₂—; and

R¹² is aryl, benzyl, cyclohexyl, 1,2,4-triazol-3-yl, or 2-benzothiazolyl.

R⁴ represents one or two substituents each of which is selected from hydrogen, halogen, cyano, alkyl, alkylsulfonyl, arylsulfonyl, arylthio, cyclohexylthio, alkoxy, aryloxy, 2-benzothiazolylthio, 2-thiazolylthio, 2-thiadiazolylthio, 2-oxadiazolylthio, 1,2,4-triazol-3-ylthio, and 2-pyrimidinylthio.

Ring A of each coupler may bear up to three substituents selected from alkyl, alkoxy, halogen, NHSO₂-alkyl and NHCOR₁, wherein R₁ is hydrogen, alkyl, alkoxy, alkylamino, aryl, cyclohexyl or furyl; R₃ is selected from hydrogen; alkyl; alkyl substituted with alkoxy, alkoxyalkoxy, aryl, cycloalkyl, cyano, CONRR, SO₂NRR, SO₃M, aryloxy, cyclohexoxy,

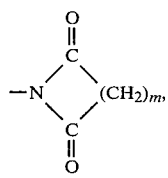

2-pyrrolidono, furyl, alkylthio, or alkylsulfonyl wherein each R is independently selected from hydrogen, alkyl, and alkyl substituted with halogen, hydroxy, phenoxy, aryl, cyano, cycloalkyl, alkylsulfonyl, alkylthio, alkanoyloxy, or alkoxy, alkylcarbamoyl; alkenyl; aryl; cycloalkyl; and alkylcycloalkyl; R₅ and R₆ are selected from hydrogen and alkyl; m is 2, 3 or 4; each alkyl, alkylene, alkenyl, aryl and cycloalkyl moiety described herein may be substituted with up to three of halogen, OH, aryl, CN, alkoxy, alkanoyl, aroylamino, acylamino, alkanoyloxy, carbamoyl, alkylcarbamoyl, sulfamyl, alkylsulfonyl, succinimido, or alkoxycarbonyl groups; all of the alkyl, alkylene and alkenyl moieties within the above definitions for both the phthalimide and coupler components contain 1-6 carbons; Q is alkylene of 2-8 carbons which may contain in its chain or pendant therefrom one or more of the following groups: —O—, —SO₂—, —S—, —OH, —OCOCH₃, —C₆H₅, —N(-SO₂CH₃)—, —N(COCH₃)—, —NHSO₂—, —N(CH₃)SO₂—, —SO₂NH—, —NHCOO—, —NHCO—, —NHCONH—, —SO₃K, and —N(SO₂C₆H₅)—; and M is hydrogen, Na⁺, K⁺, or NH₄⁺.

This invention will be further illustrated by the following examples although it will be understood that these examples are included merely for purposes of illustration and are not intended to limit the scope of the invention.

EXAMPLES of COUPLER PREPARATION

EXAMPLE 1—Sodium S-2-[ethyl(3-methylphenyl)amino] ethyl thiosulfate

Sodium thiosulfate (49.6 g, 0.2 m), sodium iodide (1 g), N-2-chloroethyl-N-ethyl-m-toluidine (19.8 g, 0.1 m), and 200 ml water were mixed and heated at about 95° C. for about 1-½ hr. The reaction mixture was cooled to about 20° C. and filtered. The white solid was washed with hexane and dried in air. Yield was 26.0 g (87.5%).

EXAMPLE 2—Sodium S-2-(1,2,3,4-tetrahydro-2,2,4,7-tetramethyl-1-quinolinyl)ethyl thiosulfate A mixture of sodium thiosulfate (49.6 g, 0.2 m), sodium iodide (1 g), N-(2-chloroethyl)-2,2,4,7-tetramethyl-1,2,3,4-tetrahydroquinoline (25.2 g, 0.1 m), water (100 ml), and ethanol (100 ml) was refluxed for 3 hrs. The mixture was cooled and extracted with two 75 ml portions of toluene. The aqueous layer then containing essentially pure product and aliquots were used to prepare dyes without further purification.

EXAMPLE 3—Sodium S-2(3,4-dihydro-3,6-dimethyl-2H-1,4-benzoxazine-4-yl)ethyl thiosulfate Sodium thiosulfate (0.2 m), sodium iodide (1 g), N-(2-chloroethyl)-3,6-dimethyl-2H-1,4-benzoxazine (0.2 m), water (150 ml), and ethanol (75 ml) were mixed and heated at reflux for 3 hrs. The alcohol was distilled off and the reaction mixture was cooled. The product, a white solid, was collected by filtration and dried in air. The yield was essentially quantitative.

EXAMPLES 4–9—Aminophthalimide Preparations

To 2-aminoethanol (12.2 g.) is added portionwise at 100°–125° C. 4-nitrophthalic anhydride (38.6 g.) with manual stirring. The mixture is heated gradually to 150° C. and kept at 150°–160° C. for 1 hr. with occasional stirring. The reaction mixture is cooled slightly and 50 ml. of ethanol is added. This solution is then drowned into 200 ml. of water. The product, N-(2-hydroxyethyl)-4-nitrophthalimide, is collected by filtration, washed with water and dred in air. It melts and 118°–119° C. and weighs 30.0 g.

EXAMPLE 5

N-(2-Hydroxyethyl)-4-nitrophthalimide (30.0 g.), ethanol (300 ml.), and Raney nickel (3.0 g.) are mixed and hydrogenated at 100° C. and 1500 psi. until hydrogen uptake ceases. The hot solution is filtered to remove the Raney nickel and the solvent evaporated to yield 4-amino-N-(2-hydroxyethyl)-phthalimide, the amine which melts at 171°–173° C.

EXAMPLE 6

A mixture of 4-nitrophthalimide (38.4 g.), iodoethane (46.8 g.), potassium carbonate (27.6 g.), and N,N-dimethylformamide (200 ml.) are heated and stirred at 95°–100° C. for 2 hrs. An additional amount of iodoethane (46.8 g.) is added and the reaction mixture heated 4 hrs. longer at 95°–100° C. The reaction mixture is drowned into 1500 ml. of water. The product, N-ethyl-4-nitrophthalimide, is collected by filtration, washed with water and recrystallized from methanol. It melts at 113°–114° C.

EXAMPLE 7

N-Ethyl-4-nitrophthalimide (28.0 g.) is hydrogenated in 400 ml. of ethanol and in the presence of Raney nickel catalyst (10 g.) at 100° C. and 1500 psi. pressure. The reaction mixture is filtered to remove the catalyst and the filtrate is concentrated to yield the product, 4-amino-N-ethylphthalimide, which is recrystallized from methanol-water mixture. It melts at 169°–171° C.

EXAMPLE 8

3-Nitrophthalimide (30.0 g.) is ethylated with iodoethane in the same manner as the 4-nitro isomer (Example 3) to yield 35.4 g. of N-ethyl-3-nitrophthalimide melting at 102°–103° C.

EXAMPLE 9

N-Ethyl-nitrophthalimide (35.4 g.) is hydrogenated as in Example 4 to yield 22.5 g. of 3-amino-N-ethylphthalimide which melts at 134°–136° C.

EXAMPLE 10

Sodium nitrite (2.88 g.) is added gradually to 20 ml. of conc. $H_2SO_4$. The solution is cooled and 1:5 acid (1 part by volume propionic acid to 5 parts by volume acetic acid) (40 ml.) is added below 15° C. To this mixture is added 4-amino-N-ethylphthalimide (7.6 g., 0.04 mole), followed by 40 ml. of 1:5 acid, all below 5° C. The reaction mixture is stirred at 0°–5° C. for 2 hrs. The following couplers (0.005 mole) are dissolved in 25 ml. of water.

To each chilled coupler solution is added a 0.005 mole aliquot of diazonium salt solution. The coupling mixtures are buffered by the addition of sodium acetate and allowed to stand for 1 hr. The coupling mixtures are diluted with water to total volume of about 200 ml. and the dyes are collected by filtration, washed with water and dried in air.

The azo compounds set forth in the following tables are prepared according to the synthesis techniques described herein and conform to the above formulae. The phthalimidyl diazo components of the compounds of the tables are bonded to the azo group at the 4-position unless otherwise indicated.

TABLE I

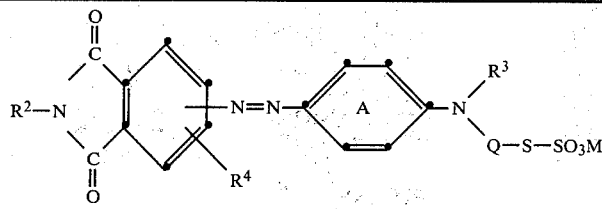

| $R^2$ | Substituents on Ring A | $R^3$ | Q | M | $R^4$ |
|---|---|---|---|---|---|
| $C_2H_5$ | 3-$CH_3$ | —$C_2H_5$ | $CH_2CH_2$ | K | H |
| $C_2H_5$ | 3-$CH_3$ | —$C_2H_5$ | $CH_2CH_2$ | K | H |
| $C_2H_5$ | 3-$CH_3$ | —$C_2H_5$ | $CH_2CH_2$ | K | H |
| $C_2H_5$ | 3-$CH_3$ | —$C_2H_5$ | $CH_2CH_2$ | K | H |
| $C_2H_5$ | 3-$CH_3$ | —$C_2H_5$ | $CH_2CH_2$ | K | H |
| $C_2H_5$ | 3-$CH_3$ | —$CH_3$ | $CH_2CH_2$ | K | H |
| $C_2H_5$ | 3-$CH_3$ | —$CH_3$ | $CH_2CH_2$ | K | H |
| $C_2H_5$ | 3-$CH_3$ | —$C_2H_5$ | $CH_2CH_2$ | K | H |
| H | 3-Cl | —$C_2H_5$ | $CH_2CH_2$ | K | H |
| H | None | —$C_2H_5$ | $CH_2CH_2$ | K | H |
| —$(CH_2)_3CH_3$ | 2-$OCH_3$, 5-$CH_3$ | H | $CH_2CH_2$ | K | $CH_3$ |
| —$(CH_2)_3CH_3$ | 2-Cl | H | $CH_2CH_2$ | K | $OC_2H_5$ |
| —$(CH_2)_3CH_3$ | 2-$CH_3$ | H | $CH_2CH_2$ | K | $OC_2H_5$ |
| —$(CH_2)_3CH_3$ | 2,5-di-$CH_3$ | H | $CH_2CH_2$ | K | H |
| —$CH_2C_6H_5$ | 3-$CH_3$ | —$C_2H_5$ | $CH_2CH_2$ | K | H |
| —$CH_2C_6H_5$ | 3-$NHCOCH_3$ | —$C_2H_5$ | $CH_2CH_2$ | K | H |
| —$C_2H_5$ | None | —$C_2H_5$ | $CH_2CH_2CH_2$ | Na | H |
| —$C_2H_5$ | 3-$CH_3$ | —$C_2H_5$ | $CH_2CH_2CH_2$ | Na | H |
| —$C_2H_5$ | 3-$CH_3$ | —$C_2H_5$ | $CH_2CH_2CH_2$ | Na | H |
| —$C_2H_5$ | 3-$NHCOCH_3$ | —$C_2H_5$ | $CH_2CH_2CH_2$ | Na | H |
| —$C_2H_5$ | 3-$NHCOOC_2H_5$ | —$C_2H_5$ | $CH_2CH_2CH_2$ | Na | H |
| —$C_2H_5$ | 3-$NHCONHC_2H_5$ | —$C_2H_5$ | $CH_2CH_2CH_2$ | Na | CN |
| —$C_2H_5$ | 3-$NHSO_2CH_3$ | —$C_2H_5$ | $CH_2CH_2CH_2$ | Na | CN |
| —$C_2H_5$ | 2-$CH_3$, 5-$NHCOCH_3$ | —$C_2H_5$ | $CH_2CH_2CH_2$ | Na | CN |
| —$C_2H_5$ | 3-$CH_3$ | —$C_2H_5$ | $CH_2CH_2CH_2$ | Na | Cl |
| —$C_2H_5$ | None | —$C_2H_5$ | $CH_2CH_2CH_2$ | Na | Cl |
| —$C_2H_5$ | 2-$CH_3$, 5-$NHCO$—$C_6H_5$ | —$C_2H_5$ | $CH_2CH_2CH_2$ | Na | Br |
| —$C_2H_5$ | 2,5-di-Cl | H | $CH_2CH_2CH_2$ | Na | Br |
| —$C_2H_5$ | None | —$C_4H_9$—n | $CH_2CH_2$ | $NH_4$ | Br |
| —$C_2H_5$ | None | —$CH_2CH(CH_3)_2$ | $CH_2CH_2$ | $NH_4$ | H |
| —$C_2H_5$ | 3-$CH_3$ | —$CH(CH_3)C_4H_9$ | $CH_2CH_2$ | Na | H |
| —$CH_2C_6H_{11}$ | 3-$CH_3$ | —$C_4H_9$—n | $CH_2CH_2$ | Na | H |
| —$CH_2C_6H_{11}$ | 3-$CH_3$ | —$C_2H_5$ | $CH_2CH_2$ | Na | H |
| —$C_6H_{11}$ | 3-$CH_3$ | —$C_2H_5$ | $CH_2CH_2$ | Na | H |
| —$C_6H_{11}$ | 3-$CH_3$ | —$C_2H_5$ | $CH_2CH_2$ | Na | H |
| —$C_6H_5$ | 3-$NHCOCH_3$ | —$CH_2CH_2CH_3$ | $CH_2CH_2$ | Na | H |
| —$C_6H_5$ | 3-NHCHO | —$CH_2CH_2CH_3$ | $CH_2CH_2$ | Na | H |
| —$C_6H_5$ | 3-$CH_3$ | —$C_2H_5$ | $CH_2CH_2$ | Na | H |
| —$(CH_2)_3OCH_3$ | 3-$CH_3$ | —$C_2H_5$ | $CH_2CH_2$ | Na | H |
| —$(CH_3)_3OCH_3$ | 3-$CH_3$ | —$C_2H_5$ | —$CH_2CH_2$ | K | H |
| —$CH_2CH_2OOCCH_3$ | 3-$CH_3$ | —$C_2H_5$ | —$CH_2CH(CH_3)$ | K | H |
| —$CH_2CH_2OOCCH_3$ | 3-$CH_3$ | —$C_2H_5$ | —$CH_2CH_2CH_2CH_2$ | K | $OC_6H_5$ |
| —$CH_2CH_2OH$ | 3-$CH_3$ | —$C_2H_5$ | —$CH_2CH_2$ | K | H |
| —$CH_2CH_2N(CH_2)_3CO$ | 3-$NHCOCH_2OH$ | —$C_2H_5$ | —$CH_2CH_2$ | K | H |
| —$CH_2CH_2N(CH_2)_3CO$ | 3-$NHCOCH_2CN$ | H | —$CH_2CH_2$ | K | H |

TABLE I-continued

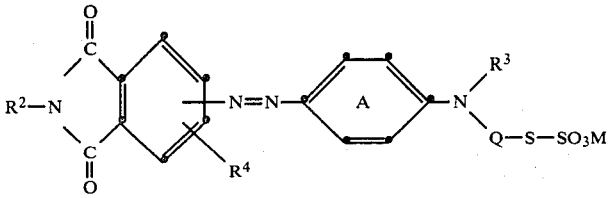

| R² | Substituents on Ring A | R³ | Q | M | R⁴ |
|---|---|---|---|---|---|
| —CH₂CH₂NHCOCH₃ | 3-NHCOCH₂OCH₃ | H | —CH₂CH₂ | K | H |
| —CH₂C₆H₄—p-OCH₃ | 3-NHCOC₆H₁₁ | H | —CH₂CH₂ | K | H |
| —CH₂CH₂C₆H₅ | 3-CH₃ | —CH₂CH₂CH₃ | —CH₂CH₂ | K | SO₂CH₃ |
| —CH₂CH₂CONH₂ | 3-CH₃ | —C₆H₁₁ | —CH₂CH₂ | K | H |
| —CH₂CH₂CN | 3-CH₃ | —C₂H₄OH | —CH₂CH₂ | K | H |
| —CH₂CH₃ | 3-CH₃ | —C₂H₄OCH₃ | —CH₂CH₂ | K | H |
| NCOCH₂CH₂CH₂ | 3-CH₃ | —C₂H₄OC₂H₄OCH₃ | —CH₂CH₂ | K | H |
| —CH₂CH₂Cl | 3-CH₃ | —C₂H₄CN | —CH₂CH₂ | K | SC₆H₅ |
| —CH₂CH₂SO₂C₆H₅ | H | —C₂H₄CONH₂ | —CH₂CH₂ | K | H |
| —CH₂CH₂NHSO₂CH₃ | 3-CH₃ | —C₂H₄SO₂NH₂ | —CH₂CH₂ | K | H |
| —CH₂CH₂N(CH₃)SO₂CH₃ | 3-CH₃ | —C₂H₄SO₂NHC₂H₅ | —CH₂CH₂ | K | H |
| —CH₂CH₂SO₂CH₂CH₃ | 3-CH₃ | —C₂H₄SO₂N(CH₃)₂ | —CH₂CH₂ | K | H |
| —CH₂CH₂SO₂CH₂CH₃ | 3-CH₃ | —C₂H₄N(COCH₂)(COCH₂) | —CH₂CH₂ | K | H |
| —C₆H₄—m-CH₃ | 3-CH₃ | —C₂H₄SO₂CH₃ | —CH₂CH₂ | K | SC₂H₅ |
| —C₆H₄—m-Cl | 3-CH₃ | —CH₂C₆H₁₁ | —CH₂CH₂ | K | H |
| —C₆H₄—p-OCH₃ | 3-CH₃ | —CH₂-(furyl) | —CH₂CH₂ | K | H |
| —CH₂CH₂COOCH₃ | 3-CH₃ | CH₂CH₂CH₂N(CO—CH₂)(CH₂ CH₂) | CH₂CH₂ | K | H |
| —CH₂CH₂Br | 3-CH₃ | CH₂CH₂CONHC₂H₅ | CH₂CH₂ | K | H |
| NCO—o-C₆H₄CO | 3-CH₃ | C₆H₅ | CH₂CH₂ | K | H |
| CH₂CH₂Cl | 3-CH₃ | CH₂CH(OH)CH₃ | CH₂CH₂ | K | H |
| CH₂Br | 3-CH₃ | C₂H₅ | CH₂CH(OH)CH₂ | K | H |
| —CH₂CH₂OOCC₆H₅ | 3-CH₃ | C₂H₅ | CH₂CH(SO₃K)CH₂ | K | H |
| —CH₂CH₂OOCOC₂H₅ | None | C₂H₄SO₃K | C₂H₄ | K | H |
| —CH₂CH₂OCH₂CH₂OH | None | C₂H₅ | CH₂CH(OCOCH₃)CH₂ | K | H |
| —CH₂CH₂OH | None | C₂H₅ | CH₂CH(C₆H₅) | K | 2-benzothiazolylthio |
| —C₆H₅ | None | C₂H₅ | CH₂CH₂OCH₂CH₂ | K | H |
| —CH₂CH₂CN | None | C₂H₅ | CH₂CH₂OCH₂CH₂CH₂CH₂ | K | H |
| n-C₄H₉ | 3-CH₃ | C₂H₅ | CH₂CH₂SO₂CH₂CH₂ | Na | H |
| —CH₂CH₃ | 3-CH₃ | C₂H₅ | CH₂CH₂SO₂CH₂CH₂ | K | H |
| CH₂OCH₂COOC₂H₅ | 2-CH₃ | SC₂H₅ | CH₂CH₂SO₂CH₂CH₂ | K | H |
| —CH₂CH₂OC₆H₅ | 2-Cl | C₂H₅ | CH₂CH₂SO₂CH₂CH₂ | K | H |
| —CH₂—C₆H₄—p-COOCH₃ | 2-OCH₃, 5-Cl | C₂H₅ | CH₂CH₂SO₂CH₂CH₂ | K | 2-thiazolylthio |
| —CH₂CH=CH₂ | 3-CH₃ | C₂H₅ | CH₂CH₂SCH₂CH₂ | K | H |
| —CH(CH₃)C₂H₅ | 3-CH₃ | C₂H₅ | CH₂CH₂N(SO₂CH₃)CH₂CH₂ | K | H |
| —CH₂COC₆H₅ | 3-CH₃ | C₂H₅ | CH₂CH₂N(COCH₃)CH₂CH₂ | K | H |
| —C₆H₄—p-SO₂CH₃ | 3-CH₃ | C₂H₅ | CH₂CH₂N(SO₂C₆H₅)CH₂CH₂ | NH₄ | H |
| —C₆H₄—p-NHCOCH₃ | 3-CH₃ | C₂H₅ | CH₂CH₂CH₂N(SO₂C₂H₅)CH₂CH₂ | K | H |
| —CH₂C₆H₁₀—p-CH₂OH | 3-CH₃ | C₂H₅ | CH₂CH₂NHSO₂CH₂CH₂ | Na | H |
| —C₂H₅ | 3-CH₃ | C₂H₅ | CH₂CH₂N(CH₂(SO₂CH₂CH₂)SO₂CH₂CH₂) | Na | 2-thiadiazolylthio |
| —C₂H₅ | 3-CH₃ | C₂H₅ | CH₂CH₂SO₂NHCH₂CH₂ | Na | H |
| —C₂H₅ | 3-CH₃ | C₂H₅ | CH₂CH₂NHCOCH₂CH₂ | Na | H |
| —C₂H₅ | 3-CH₃ | C₂H₅ | CH₂CH₂NHCOCH₂ | Na | H |
| —C₂H₅ | 3-CH₃ | C₂H₅ | CH₂CH₂CON(CH₃)C₂H₄ | Na | H |
| —C₂H₅ | 3-CH₃ | C₂H₅ | CH₂CH₂CH₂CH₂ | K | H |
| —C₂H₅ | 3-CH₃ | C₂H₅ | CH₂CH₂CH₂ | K | 2-oxadiazolylthio |
| —C₂H₅ | 3-CH₃ | C₂H₅ | CH₂CH₂OCH₂CH₂ | Na | H |
| —C₂H₅ | 3-CH₃ | C₂H₅ | CH₂CH₂SO₂CH₂CH₂ | Na | H |
| —C₂H₅ | 3-Cl | C₂H₅ | CH₂CH₂SO₂CH₂CH₂ | Na | H |
| —C₂H₅ | 2,5-di-Cl | H | CH₂CH₂SO₂CH₂CH₂ | Na | 2-Pyrimidinyl- |

TABLE I-continued

| $R^2$ | Substituents on Ring A | $R^3$ | Q | M | $R^4$ |
|---|---|---|---|---|---|
| | | | | | thio |
| $-C_2H_5$ | 3-$CH_3$ | $C_2H_5$ | $CH_2CH_2SO_2CH_2CH_2$ | Na | H |
| $-C_2H_5$ | None | $C_2H_5$ | $CH_2CH_2SO_2CH_2CH_2$ | Na | H |
| $-C_2H_5$ | None | $C_2H_5$ | $CH_2CH_2SO_2CH_2CH_2$ | Na | H |
| $-C_2H_5$ | None | $C_2H_5$ | $CH_2CH_2SO_2CH_2CH_2$ | Na | H |
| $-C_2H_5$ | None | $C_2H_5$ | $CH_2CH_2SO_2CH_2CH_2$ | Na | H |
| $-C_2H_5$ | None | $C_2H_5$ | $CH_2CH_2SO_2CH_2CH_2$ | Na | H |
| $-C_2H_5$ | None | $C_2H_5$ | $CH_2CH_2SO_2CH_2CH_2$ | Na | H |
| $-C_2H_5$ | None | $C_2H_5$ | $CH_2CH_2SO_2CH_2CH_2$ | Na | H |
| $-C_2H_5$ | None | $C_2H_5$ | $CH_2CH_2NHCONHC_2H_4$ | Na | H |
| $-C_2H_5$ | 3-NHCO-(furan) | $C_2H_5$ | $CH_2CH_2$ | K | H |
| $-C_2H_5$ | 3-$CH_3$ | $C_2H_5$ | $CH_2CH_2$ | K | H |
| $-C_2H_5$ | 3-$CH_3$ | $C_2H_5$ | $CH_2CH_2$ | K | H |
| $-C_2H_5$ | 3-$CH_3$ | $C_2H_5$ | $CH_2CH_2$ | K | H |
| $-C_2H_5$ | 3-$CH_3$ | $C_2H_5$ | $CH_2CH_2$ | K | H |
| $-C_2H_5$ | 3-$CH_3$ | $C_2H_5$ | $CH_2CH_2$ | K | H |
| $-C_2H_5$ | 3-$CH_3$ | $C_2H_5$ | $CH_2CH_2$ | K | H |
| $-C_2H_5$ | 3-$CH_3$ | $C_2H_5$ | $CH_2CH_2$ | K | H |
| $-C_2H_5$ | 3-$CH_3$ | $C_2H_5$ | $CH_2CH_2$ | K | H |

TABLE II

| $R^2$ | Substituents on Ring A | $R^5$ | $R^6$ | Q | M | $R^4$ |
|---|---|---|---|---|---|---|
| $-C_2H_5$ | 7-$CH_3$ | H | H | $CH_2CH_2$ | K | H |
| $-C_2H_5$ | 7-$CH_3$ | $CH_3$ | H | $CH_2CH_2$ | K | H |
| $-C_2H_5$ | 7-$CH_3$ | H | $CH_3$ | $CH_2CH_2$ | K | H |
| $-C_2H_5$ | 7-$CH_3$ | H | $CH_3$ | $CH_2CH_2CH_2$ | K | H |
| $-C_2H_5$ | 7-$CH_3$ | $CH_3$ | $CH_3$ | $CH_2CH_2$ | K | H |
| H | 7-$CH_3$ | $CH_3$ | $CH_3$ | $CH_2CH_2$ | K | H |
| H | 7-$CH_3$ | H | H | $CH_2CH_2$ | K | H |
| $-(CH_2)_3CH_3$ | 7-$CH_3$ | $CH_3$ | $CH_3$ | $CH_2CH_2$ | K | H |
| $-(CH_2)_3CH_3$ | 7-$CH_3$ | H | H | $CH_2CH_2$ | $NH_4$ | H |
| $-CH_2C_6H_5$ | 7-$CH_3$ | H | $CH_3$ | $CH_2CH_2CH_2$ | Na | H |
| $-CH_2C_6H_5-p-Cl$ | 7-$CH_3$ | H | $CH_3$ | $CH_2CH_2CH_2$ | Na | $CH_3$ |
| $-C_2H_5$ | 7-$CH_3$ | H | $CH_3$ | $CH_2CH_2CH_2CH_2$ | Na | $OC_2H_5$ |
| $-C_2H_5$ | 7-$CH_3$ | H | $CH_3$ | $CH_2CH_2OCH_2CH_2$ | Na | $OC_2H_5$ |
| $-C_2H_5$ | 7-$CH_3$ | H | $CH_3$ | $CH_2CH_2SO_2CH_2CH_2$ | Na | H |
| $-C_2H_5$ | H | H | $CH_3$ | $CH_2CH_2SO_2CH_2CH_2$ | Na | H |
| $-C_2H_5$ | 7-Cl | H | $CH_3$ | $CH_2CH_2$ | Na | H |
| $-C_2H_5$ | 5,8-di-$CH_3$ | H | $CH_3$ | $CH_2CH_2$ | Na | H |
| $-C_2H_5$ | 5,8-di-$OCH_3$ | H | $CH_3$ | $CH_2CH_2$ | Na | H |
| $-C_2H_5$ | 5-$OCH_3$, 8-$CH_3$ | H | $CH_3$ | $CH_2CH_2$ | Na | H |
| $-C_2H_5$ | 5-$OCH_3$, 8-Cl | H | $CH_3$ | $CH_2CH_2$ | Na | H |
| $-C_2H_5$ | 7-$NHCOCH_3$ | H | $CH_3$ | $CH_2CH_2$ | Na | H |
| $-CH_2C_6H_{11}$ | 7-NHCOH | H | $CH_3$ | $CH_2CH_2$ | Na | CN |
| $-CH_2C_6H_{11}$ | 7-$NHSO_2CH_3$ | $CH_3$ | $CH_3$ | $CH_2CH_2$ | Na | CN |
| $-C_6H_{11}$ | 7-$NHCONHC_2H_5$ | $CH_3$ | $CH_3$ | $CH_2CH_2$ | Na | CN |
| $-C_6H_{11}$ | 5-$CH_3$, 8-$NHCOCH_3$ | $CH_3$ | $CH_3$ | $CH_2CH_2$ | Na | Cl |
| $-C_6H_5$ | 7-$NHCOC_6H_5$ | $CH_3$ | $CH_3$ | $CH_2CH_2$ | Na | Cl |
| $-C_6H_5$ | 7-$NHCOC_6H_{11}$ | $CH_3$ | $CH_3$ | $CH_2CH_2$ | Na | Br |

TABLE II-continued

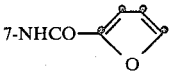

| R² | Substituents on Ring A | R⁵ | R⁶ | Q | M | R⁴ |
|---|---|---|---|---|---|---|
| —C₆H₅ | 7-NHCOCH₂OH | CH₃ | CH₃ | CH₂CH₂ | Na | Br |
| —(CH₂)₃OCH₃ | 7-NHCOCH₂Cl | CH₃ | CH₃ | CH₂CH₂ | Na | Br |
| —(CH₃)₃OCH₃ | 7-NHCOCH₂OCH₃ | CH₃ | CH₃ | CH₂CH₂ | Na | H |
| —CH₂CH₂OOCCH₃ | 7-CH₃ | H | CH₃ | CH₂CH₂SCH₂CH₂ | Na | H |
| —CH₂CH₂OOCCH₃ | 7-CH₃ | H | CH₃ | CH₂CH(OH)CH₂ | Na | H |
| —CH₂CH₂OH | 7-CH₃ | H | CH₃ | CH₂CH(OCOCH₃)CH₂ | Na | H |
| —CH₂CH₂N(CH₂)₃CO | 7-CH₃ | H | CH₃ | CH₂CH(CH₃) | K | H |
| —CH₂CH₂N(CH₂)₃CO | 7-CH₃ | H | CH₃ | CH₂CH(C₆H₅) | K | H |
| —CH₂CH₂NHCOCH₃ | 7-CH₃ | H | CH₃ | CH₂CH₂N(SO₂CH₃)CH₂CH₂CH₂ | K | H |
| —CH₂C₆H₄—p-OCH₃ | 7-CH₃ | H | CH₃ | CH₂CH₂N(COCH₃)CH₂CH₂ | K | H |
| —CH₂CH₂C₆H₅ | 7-CH₃ | H | CH₃ | CH₂CH₂SO₂NHC₂H₄ | K | H |
| —CH₂CH₂CONH₂ | 7-CH₃ | H | CH₃ | CH₂CH₂NHSO₂CH₂CH₂ | Na | H |
| —CH₂CH₂CN | 7-CH₃ | H | CH₃ | CH₂CH₂CH₂NHCOCH₂CH₂ | Na | H |
| —CH₂CH₃ | 7-CH₃ | H | CH₃ | CH₂CH₂CONHC₂H₄ | Na | H |
| CH₂CH₃ | 7-CH₃ | H | CH₃ | CH₂CH₂NHCOCH₂ | Na | OC₆H₅ |
| —CH₂CH₂Cl | 7-CH₃ | H | CH₃ | CH₂CH₂NHCONHC₂H₄ | Na | H |
| —CH₂CH₂SO₂C₆H₅ | 7-CH₃ | H | CH₃ | CH₂CH₂N(CH₃)SO₂C₂H₄ | Na | H |
| —CH₂CH₂NHSO₂CH₃ | 7-CH₃ | H | CH₃ | CH₂CH₂N(SO₂C₆H₅)CH₂CH₂CH₂ | Na | H |
| —CH₂CH₂N(CH₃)SO₂CH₃ | 7-CH₃ | H | CH₃ | CH₂CH(SO₃K)CH₂ | K | H |
| —CH₂CH₂SO₂CH₂CH₃ | 7-CH₃ | H | CH₃ | CH₂CH₂SO₂N(CH₃)C₂H₄ | K | H |
| —CH₂CH₂SO₂CH₂CH₃ | 7-NHCO—(oxazole) | H | CH₃ | CH₂CH₂SO₂N(CH₃)C₂H₄ | K | SO₂CH₃ |
| —C₆H₄—m-CH₃ | 7-CH₃ | H | CH₃ | CH₂CH₂SO₂N(CH₃)C₂H₄ | K | H |
| —C₆H₄—m-Cl | 7-CH₃ | H | CH₃ | CH₂CH₂SO₂N(CH₃)C₂H₄ | K | H |
| —C₆H₄—p-OCH₃ | 7-CH₃ | H | CH₃ | CH₂CH₂SO₂N(CH₃)C₂H₄ | K | H |
| —CH₂CH₂COOCH₃ | 7-CH₃ | H | CH₃ | CH₂CH₂SO₂N(CH₃)C₂H₄ | K | H |
| —CH₂CH₃ | 7-CH₃ | H | H | CH₂CH₂SO₂N(CH₃)C₂H₄ | K | SC₆H₅ |
| C₆H₅ | 7-CH₃ | H | CH₃ | CH₂CH₂SO₂N(CH₃)C₂H₄ | K | H |
| CH₂CH₃ | 7-CH₃ | H | CH₃ | CH₂CH₂SO₂N(CH₃)C₂H₄ | K | H |
| C₆H₁₁ | 7-CH₃ | H | CH₃ | CH₂CH₂SO₂N(CH₃)C₂H₄ | K | H |
| —CH₂CH₂OOCC₆H₅ | 7-CH₃ | H | CH₃ | CH₂CH₂SO₂N(CH₃)C₂H₄ | K | H |

TABLE III

| R² | Substituents on Ring A | R⁵ | Q | M | R⁴ |
|---|---|---|---|---|---|
| —C₂H₅ | None | H | CH₂CH₂ | K | H |
| —C₂H₅ | None | CH₃ | CH₂CH₂ | K | H |
| —C₂H₅ | 6—CH₃ | H | CH₂CH₂ | K | H |
| —C₂H₅ | 6—OCH₃ | CH₃ | CH₂CH₂ | K | H |
| —C₂H₅ | 6—OC₄H₉—n | CH₃ | CH₂CH₂ | K | H |
| —C₂H₅ | None | CH₃ | CH₂CH₂CH₂ | K | H |
| —C₂H₅ | 6—CH₃ | CH₃ | CH₂CH₂OCH₂CH₂ | Na | H |
| —C₂H₅ | 6—CH₃ | CH₃ | CH₂CH₂SO₂CH₂CH₂ | Na | H |
| H | 6—CH₃ | CH₃ | CH₂CH₂SCH₂CH₂ | Na | H |
| H | 6—CH₃ | CH₃ | CH₂CH₂CH₂CH₂ | Na | H |
| —(CH₂)₃CH₃ | 6—CH₃ | CH₃ | CH₂CH(OH)CH₂ | Na | CH₃ |
| —(CH₂)₃CH₃ | 6—CH₃ | CH₃ | CH₂CH(OCOCH₃)CH₂ | Na | OC₂H₅ |
| —(CH₂)₃CH₃ | 6—CH₃ | CH₃ | CH₂CH(SO₃K)CH₂ | K | OC₂H₅ |
| —(CH₂)₃CH | 6—CH₃ | CH₃ | CH₂CH(C₆H₅) | NH₄ | H |

TABLE III-continued

| R² | Substituents on Ring A | R⁵ | Q | M | R⁴ |
|---|---|---|---|---|---|
| —CH₂C₆H₅ | 6—CH₃ | CH₃ | CH₂CH₂N(SO₂CH₃)CH₂CH₂ | Na | H |
| —CH₂C₆H₅ | 6—CH₃ | CH₃ | CH₂CH₂N(COCH₃)CH₂CH | Na | H |
| —C₂H₅ | 6—CH₃ | CH₃ | CH₂CH₂CH₂ | Na | H |
| —C₂H₅ | 6—CH₃ | CH₃ | CH₂CH₂CH₂NHSO₂CH₂CH₂ | K | H |
| —C₂H₅ | 6—CH₃ | CH₃ | CH₂CH₂N(CH₃)SO₂CHCH₂ | K | H |
| —C₂H₅ | 6—CH₃ | CH₃ | CH₂CH₂SO₂NHCH₂CH₂ | K | H |
| —C₂H₅ | 6—CH₃ | CH₃ | CH₂CH₂NHCOOCH₂CH₂ | K | H |
| C₂H₅ | 6—CH₃ | CH₃ | CH₂CH₂NHCOCH₂ | K | CN |
| —C₂H₅ | 6—CH₃ | CH₃ | CH₂CH₂NHCONCH₂CH₂ | Na | CN |
| C₂H₅ | 6—CH₃ | CH₃ | CH₂CH(CH₃) | K | CN |
| C₂H₅ | 6—CHd₂CN | CH₃ | CH₂CH₂ | K | Cl |
| —C₂H₅ | 6—CH₂OH | CH₃ | CH₂CH₂ | K | Cl |
| —C₂H₅ | 6—CH₂Cl | CH₃ | CH₂CH₂ | K | Br |
| —C₂H₅ | 6—CH₂COOCH₃ | CH₃ | CH₂CH₂ | K | Br |
| C₂H₅ | 6—CH₂OC₂H₅ | CH₃ | CH₂CH₂ | K | Br |
| —C₂H₅ | 6—CH₃ | CH₃ | CH₂CH₂ | K | H |
| —C₂H₅ | 6—CH₃ | CH₂CH₃ | CH₂CH₂SO₂CH₂CH₂ | K | H |
| —CH₂C₆H₁₁ | 6—CH₃ | CH₃ | CH₂CH₂SO₂CH₂CH₂ | K | H |
| —CH₂C₆H₅ | 6—CH₃ | CH₃ | CH₂CH₂SO₂CH₂CH₂ | K | H |
| —C₆H₁₁ | None | CH₃ | CH₂CH₂SO₂CH₂CH₂ | K | H |
| —C₆H₁₁ | 6—CH₃ | CH₃ | CH₂CH₂ | K | H |
| —C₆H₅ | None | CH₃ | CH₂CH₂ | K | H |
| —C₆H₅ | 6—CH₂Cl | CH₃ | CH₂CH₂ | K | H |
| —C₆H₅ | 6—CH₃ | CH₃ | CH₂CH₂CH₂ | K | H |
| —(CH₂)₃OCH | 6—CH₃ | CH₃ | CH₂CH₂ | K | H |
| —(CH₂)₃OCH₂CH₂Cl | 6—CH₃ | CH₃ | CH₂CH₂ | K | H |
| —CH₂CH₂OOCC₂H₅ | 6—CH₃ | CH₃ | CH₂CH₂ | K | H |
| —CH₂CH₂OOCCH₃ | 6—CH₃ | CH₃ | CH₂CH₂ | K | OC₆H₅ |
| —CH₂CH₂OH | 6—CH₃ | CH₃ | CH₂CH₂ | K | H |
| —CH₂CH₃ | 6—CH₃ | CH₂CH₂ | K | H | |
| —CH₂CH₂N(CH₂)₃CO | 6—CH₃ | CH₃ | CH₂CH₂ | K | H |
| —CH₂CH₂NHCOCH₃ | 6—CH₃ | CH₃ | CH₂CH₂ | K | H |
| —CH₂C₆H₄—p-OCH₃ | 6—NHCOCH₃ | CH₃ | CH₂CH₂ | K | H |
| —CH₂CH₂C₆H₅ | 6—NHCOC₂H₅ | CH₃ | CH₂CH₂ | K | SO₂CH₃ |
| —CH₂CH₂CONH₂ | 6—NHCHO | CH₃ | CH₂CH₂ | K | H |
| —CH₂CH₂CN | 6—NHCOCH₂CN | CH₃ | CH₂CH₂ | K | H |
| —CH₂CH₂Br | 6—NHCOCH₂OCH₃ | CH₃ | CH₂CH₂ | K | H |
| CH₂CH₃ | 6—NHCOCH₂OCH₃ | CH₃ | CH₂CH₂ | K | H |
| —CH₂CH₂Cl | 6—NHCOC₆H₁₁ | CH₃ | CH₂CH₂ | K | SC₆H₅ |
| —CH₂CH₂SO₂C₆H₅ | 6—NHCOC₆H₅ | CH₃ | CH₂CH₂ | K | H |
| —CH₂CH₂NHSO₂CH₃ | 6—Cl | CH₃ | CH₂CH₂ | K | H |
| —CH₂CH₂NHCH₂SO₂CH₃ | 6—NHCONHC₂H₅ | CH₃ | CH₂CH₂ | K | H |
| —CH₂CH₂SO₂CH₂CH₃ | 6—NHSO₂CH₃ | CH₃ | CH₂CH₂ | K | H |
| —CH₂CH₂SO₂CH₂CH₃ | 6—NHCOCH₂OC₆H₅ | CH₃ | CH₂CH₂ | K | H |
| —C₆H₄—m-CH₃ | 6—CH₃ | CH₃ | CH₂CH₂ | K | SC₂H₅ |
| —C₆H₄—m-Cl | 6—CH₃ | CH₃ | CH₂CH₂ | K | H |
| —C₆H₄—p-OCH₃ | 6—CH₃ | CH₃ | CH₂CH₂ | K | H |
| —CH₂CH₂COOCH₃ | None | CH₃ | CH₂CH₂ | K | H |
| —CH₂CH₃ | 6—CH₃ | None | CH₂CH₂ | K | H |

The invention has been described in detail with particular reference to preferred embodiments thereof, but it will be understood that variations and modifications can be effected within the spirit and scope of the invention.

We claim:

1. A compound having the formula

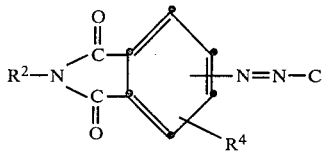

wherein C is a coupler selected from those having the formula

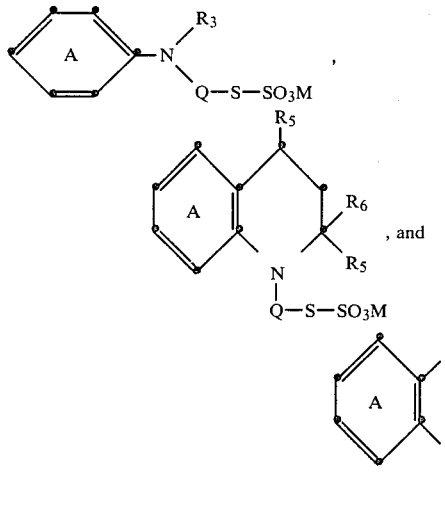

wherein $R^2$ is selected from hydrogen and the following groups: alkyl; cyclohexyl; cyclohexyl substituted with alkyl; and alkyl substituted with alkoxy, aryl, aryloxy, cyclohexyl, cyano, alkanoyloxy, alkoxycarbonyl, alkoxycarbonyloxy, aroyloxy, alkylcarbamoyloxy, arylcarbamoyloxy, or with a group having the formula

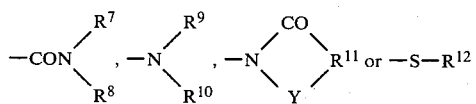

wherein
$R^7$ is hydrogen, alkyl or aryl;
$R^8$ is hydrogen or alkyl;
$R^7$ and $R^8$ collectively are $-(CH_2)_5-$ or $-CH_2CH_2OCH_2CH_2-$;
$R^9$ is alkanoyl or aroyl;
$R^{10}$ is hydrogen, alkyl, aryl or cyclohexyl;
$R^{11}$ is ethylene, propylene, trimethylene, o-cyclohexylene, or o-arylene, or when Y is $-CO-$, $R^{11}$ also can be $-NHCH_2-$, $-N(\text{lower alkyl})CH_2-$, $-SCH_2-$, $-OCH_2-$ or $-CH_2OCH_2-$;
Y is $-CH_2-$, $-CO-$, or $-SO_2-$; and
$R^{12}$ is aryl, benzyl, cyclohexyl, 1,2,4-triazol-3-yl, or 2-benzothiazolyl;
$R^4$ represents one or two substituents each of which is selected from hydrogen, halogen, cyano, alkyl, alkylsulfonyl, arylsulfonyl, arylthio, cyclohexylthio, alkoxy, aryloxy, 2-benzothiazolylthio, 2-thiazolylthio, 2-thiadiazolylthio, 2-oxadiazolylthio, 1,2,4-triazol-3-ylthio, 2-pyrimidinylthio, and such groups substituted with up to three of halogen, OH, aryl, CN, alkoxy, alkanoyl, aroylamino, alkylamino, alkanoyloxy, carbamoyl, alkylcarbamoyl, sulfamyl, alkylsulfonyl, succinimido, or alkoxycarbonyl groups;
each ring A of the couplers is unsubstituted or substituted with up to three substituents selected from alkyl, alkoxy, halogen, $NHSO_2$-alkyl, $NHCOR_1$ or such groups substituted with up to three of halogen, OH, aryl, CN, alkoxy, alkanoyl, aroylamino, alkylamino, alkanoyloxy, carbamoyl, alkylcarbamoyl, sulfamyl, alkylsulfonyl, succinimido, or alkoxycarbonyl groups, wherein $R_1$ is hydrogen, alkyl, alkoxy, alkylamino, aryl, cyclohexyl, furyl, cycloalkyl, or such groups substituted with up to three of halogen, OH, aryl, CN, alkoxy, alkanoyl, aroylamino, alkylamino, alkanoyloxy, carbamoyl, alkylcarbamoyl, sulfamyl, alkylsulfonyl, succinimido, or alkoxycarbonyl groups;
$R_3$ is selected from hydrogen; alkyl; alkyl substituted with alkoxy, alkoxyalkoxy, aryl, cycloalkyl, cyano, CONRR, $SO_2NRR$, $SO_3M$, aryloxy, cyclohexoxy,

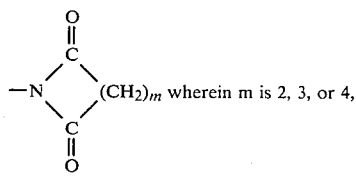

2-pyrrolidono, furyl, alkylthio, or alkylsulfonyl wherein each R is independently selected from hydrogen, alkyl, and alkyl substituted with halogen, hydroxy, phenoxy, aryl, cyano, cycloalkyl, alkylsulfonyl, alkylthio, alkanoyloxy, or alkoxy; alkylcarbamoyl; alkenyl; aryl; cycloalkyl; and alkylycloalkyl;
$R_5$ and $R_6$ are each independently selected from hydrogen, alkyl, and alkyl substituted with up to three of halogen, OH, aryl, CN, alkoxy, alkanoyl, aroylamino, alkylamino, alkanoyloxy, carbamoyl, alkylcarbamoyl, sulfamyl, alkylsulfonyl, succinimido, or alkoxycarbonyl groups;
Q is selected from alkylene of 2–8 carbons, alkylene of 2–8 carbons substituted by one to three groups selected from $-OH$, $-OCOCH_3$, $-C_6H_5$, and $-SO_3K$, and alkylene of 2–8 carbons which contain in its chain one to three groups selected from $-O-$, $-SO_2-$, $-S-$, $-N(SO_2CH_3)-$, $-N(COCH_3)-$, $-NHSO_2-$, $-N(CH_3)SO_2-$, $-SO_2NH-$, $-NHCOO-$, $-NHCO-$, $-NHCONH-$, and $-N(SO_2C_6H_5)-$; and M is $H^+$, $Na^+$, $K^+$, or $NH_4^+$.

2. The compound according to claim 1 having the formula

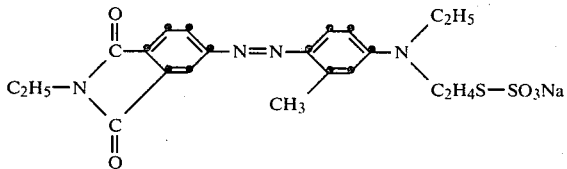

3. The compound according to claim 1 having the formula

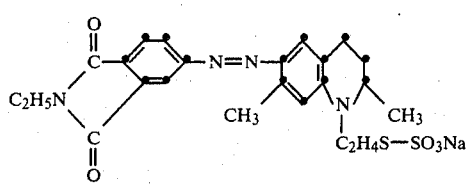
4. The compound according to claim 1 having the formula
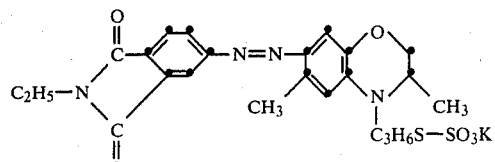
* * * * *